United States Patent [19]
Tsujimoto

[11] Patent Number: 5,398,259
[45] Date of Patent: Mar. 14, 1995

[54] DECISION-FEEDBACK EQUALIZER FOR CANCELLING CW INTERFERENCE

[75] Inventor: Ichiro Tsujimoto, Tokyo, Japan

[73] Assignee: NEC Corporation, Tokyo, Japan

[21] Appl. No.: 86,554

[22] Filed: Jul. 1, 1993

[30] Foreign Application Priority Data

Jul. 1, 1992 [JP] Japan .................................. 4-173931
Jul. 13, 1992 [JP] Japan .................................. 4-184873

[51] Int. Cl.$^6$ ............................................ H03K 5/159
[52] U.S. Cl. ..................................... 375/233; 375/343;
375/349; 364/724.2; 333/18
[58] Field of Search ....................... 375/11, 14, 15, 96,
375/99, 101, 102; 370/32, 32.1; 333/18, 28 R;
364/724.2; 348/614

[56] References Cited

U.S. PATENT DOCUMENTS

5,119,401 6/1992 Tsujimoto ............................ 375/14
5,247,541 9/1993 Nakai .................................... 375/14

OTHER PUBLICATIONS

Loh-Min Li, et al., *Rejection of CW Interference in QPSK Systems Using Decision-Feedback Filters*, IEEE Transactions on Communication, vol. COM-31, No. 4, Apr. 1983.

*Primary Examiner*—Stephen Chin
*Assistant Examiner*—Don Vo

*Attorney, Agent, or Firm*—Ostrolenk, Faber, Gerb & Soffen

[57] ABSTRACT

In an interference canceller, a feedforward filter receives an input signal to produce an equalized feedforward output signal in which CW interference is cancelled and a feedback filter receives the output of a decision circuit to produce an equalized feedback output signal. The equalized feedforward and feedback output signals are combined together to cancel intersymbol interference before being applied to the decision circuit. First tap-gain control circuits derive first tap-gain signals from a decision error and signals at the first delay-line taps and respectively apply these signals to the first tap-gain multipliers. Second tap-gain control circuits derive second tap-gain signals from the decision error and signals at the second delay-line taps and respectively apply these signals to the second tap-gain multipliers. A complex correlation is detected between signals at opposite ends of the first tapped delay line and compared with a threshold. At the instant the detected correlation becomes lower than the threshold, all tap-gain control circuits are caused to hold their outputs at the amplitude values which were attained at that instant. In a modified embodiment, correlations between the input signal received by the first tapped delay line and the delayed signals at the first delay-line taps are detected and normalized by a factor 1/N where N is equal to the number of delay taps. The normalized correlations are used as the tap-gain signals for all the tap-gain multipliers.

5 Claims, 6 Drawing Sheets

DECISION-FEEDBACK EQUALIZER FOR CANCELLING CW INTERFERENCE

BACKGROUND OF THE INVENTION

1. Field of the Invention

The present invention relates to a decision-feedback equalizer for cancelling continuous wave (CW) interference and intersymbol interference.

2. Description of the Related Art

A decision-feedback equalizer, as described in a paper "Rejection of CW Interference in QPSK Systems Using Decision-Feedback Filters", Loh-Ming Li et al., *IEEE Transactions on Communications*, pages 473-483, Vol. COM-31, No. 4, April 1983, comprises a feedforward filter for receiving an input signal for cancelling narrow-band continuous wave (CW) interference, a decision circuit, and a feedback filter for receiving the output of the decision circuit. The outputs of both filters are combined to cancel intersymbol interference and applied to the decision circuit where a decision is made between binary levels. Each filter is a transversal filter configuration in which a tapped delay line is formed and a plurality of tap-gain multipliers are connected to the delay-line taps, the outputs of the multipliers being summed to produce the filter output. The tap-gain values of the multipliers are derived from a decision error and adaptively updated according to the least-mean square (LMS) algorithm. If the narrow-band CW interference is a sequence of periodic bursts, the tap-gain values of the multipliers of both filters must be quickly adapted to the presence and absence of CW bursts. However, the exponential convergence characteristic of the LMS adaptive control causes the tap-gain values to rise exponentially from zero to optimum values at the leading edge of each CW burst and then decay exponentially to zero at the trailing edge of the burst. If the CW burst rate is high, the adaptive tap-gain control would be too slow to adapt itself to the varying level of interference and the decision-feedback equalizer would suffer undesirable performance degradation. In addition, the decision error is of substantial value when the equalizer is affected by such strong interference where the D/U (desired-to-undesired) ratio assumes a negative value. Under such circumstances, the adaptive tap-gain control would diverge due to the propagation of decision errors along the tapped delay line of the feedback filter. Although the use of a training burst in a data sequence during initial pull-in operation may solve this problem, it is only achieved at the cost of transmission efficiency.

SUMMARY OF THE INVENTION

It is therefore an object of the present invention to provide a decision-feedback equalizer which can be used when received signals are interfered with CW periodic bursts.

Another object of the present invention is to provide a decision-feedback equalizer that can be used for signals severely affected by strong interference.

According to a first aspect of the present invention, there is provided an interference canceller comprising a feedforward equalizer and a feedback equalizer. The feedforward equalizer comprises a first tapped delay line for receiving an input signal to produce successively delayed versions of the received signal at first delay-line taps. First tap-gain multipliers are included to operate on the delayed signals at the first delay-line taps. The input signal received by the first tapped delay line and the outputs of the first tap-gain multipliers are combined to produce an equalized feedforward output signal in which CVV interference is cancelled. The feedback equalizer comprises a second tapped delay line for receiving defining second delay-line taps to produce successively delayed versions of an output signal from a decision circuit at the second delay-line taps, and second tap-gain multipliers for operating on the delayed signals at the second delay-line taps. The output signals of the second tap-gain multipliers are combined to produce an equalized feedback output signal. The equalized feedforward and feedback output signals are combined to cancel intersymbol interference before being applied to the decision circuit. A decision error detector provides detection of a decision error from the input and output of the decision circuit. A plurality of first tap-gain control circuits derive first tap-gain signals from the detected decision error and the delayed signals at the first delay-line taps and respectively apply the first tap-gain signals to the first tap-gain multipliers. A plurality of second tap-gain control circuits derive second tap-gain signals from the detected decision error and the delayed signals at the second delay-line taps and respectively apply the second tap-gain signals to the second tap-gain multipliers. A complex correlator is provided for detecting a correlation between signals at opposite ends of the first tapped delay line. The detected correlation is compared with a reference value and the first and the second tap-gain control circuits are caused to hold the tap-gain signals at the amplitude values attained when the detected correlation is determined to be lower than the reference value.

According to a second aspect of the invention, there is provided an interference canceller comprising a feedforward equalizer in which the first tapped delay line receives an input signal and defines first N delay-line taps to produce delayed versions of the received input signal at the first delay-line taps, and the first N tap-gain multipliers operate on the delayed signals at the first delay-line taps. The input signal received by the first tapped delay line and output signals from the first tap-gain multipliers are combined to produce an equalized feedforward output signal in which CW interference is cancelled. The feedback equalizer comprises a second tapped delay line for receiving the output signal of the decision circuit and producing delayed versions of the decision output signal at the second delay-line taps, and second tap-gain multipliers for operating on the delayed signals at the second delay-line taps. The output signals from the second tap-gain multipliers are combined to produce an equalized feedback output signal in which CW interference is cancelled. A plurality of tap-gain control circuits detect correlations between the input signal received by the first tapped delay line and the delayed signals at the first delay-line taps and normalize each of the detected correlations by a factor which is reciprocal of the integer N to produce N tap-gain signals which are respectively applied to the first N tap-gain multipliers and the N second tap-gain multipliers. The equalized feedforward and feedback output signals combined to cancel intersymbol interference before being applied to the decision circuit. Preferably, the root-mean-square value of the detected decision error is detected and compared with a prescribed value. First paths are established for respectively coupling the first N tap-gain signals to the first N tap-gain multipliers and to the second N tap-gain multipliers when the root-mean-square value is higher than the prescribed value, and the first paths are cleared and second paths are established for respectively coupling the second N tap-gain signals to the first N tap-gain multipliers and respectively coupling the third N tap-gain signals to the second N tap-gain multipliers when the root-mean-square value is lower than the prescribed value.

BRIEF DESCRIPTION OF THE DRAWINGS

The present invention will be described in further detail with reference to the accompanying drawings, in which.

DETAILED DESCRIPTION

Figure 1:
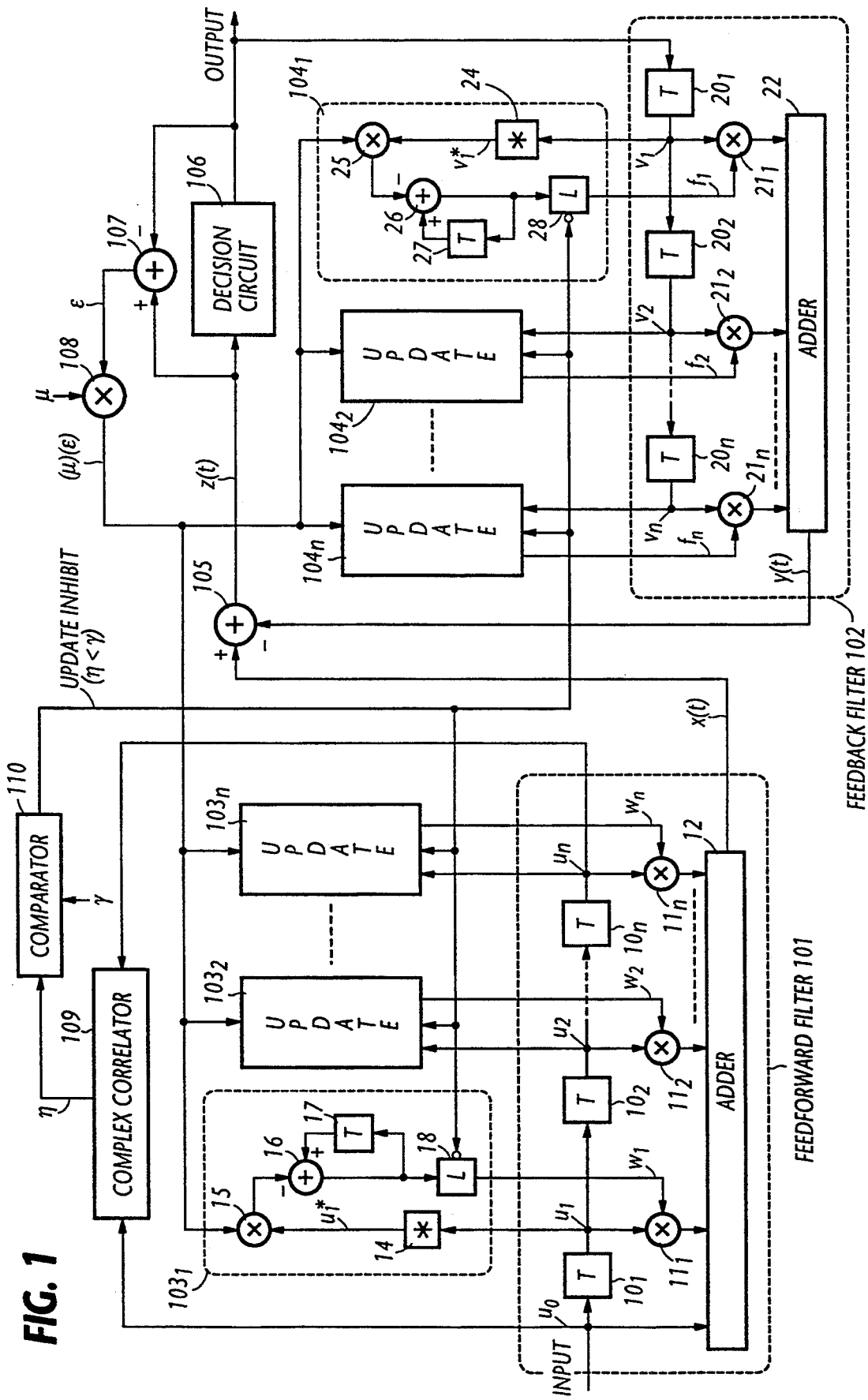
FIG. 1 is a block diagram of an interference canceller according to a first embodiment of the present invention.

Referring to FIG. 1, there is shown an interference canceller of the decision-feedback equalizer type according to a first embodiment of the present invention. The decision-feedback equalizer is incorporated in a receiver of a QPSK (quadrature phase-shift keyed) system in which the transmitted signal is affected by narrow-band continuous wave (CW) interference of periodic bursts as those transmitted from a pulsed radar. The received signal is demodulated and converted to an intermediate frequency by a preceding stage of the receiver and fed into the interference canceller. The interference canceller includes a feedforward equalizer or filter 101 and a feedback filter 102. A subtractor 105 is connected between these filters for taking the difference between their output signals. A threshold decision circuit 106 is connected between the output of subtractor 105 and the output of the interference canceller from which feedback filter 102 takes its input for comparison with a predetermined threshold for making a decision in favor of a logic 1 or 0 depending on the result of the comparison. An error detector 107 is provided for producing an error signal $\epsilon$ representing the difference between signals at the input and output of decision circuit 106. The output of error detector 5 is multiplied by a constant $\mu$ by a multiplier 108 to supply an output signal $(\mu)(\epsilon)$ to tap-gain update circuits of both filters 101 and 102.

Feedforward filter 101 includes a tap delay line formed by a series of unit-time (T) delay tap elements $10_1$–$10_n$ to which the IF input signal from the preceding stage is applied to produce a series of successively delayed tap signals $u_0, u_1, u_2, \ldots u_n$, where T is equal to the symbol interval of the incoming signal. These tap signals are represented as follows:

$$u_i = a_{-i} + s_n(t-iT) + \sqrt{s_j} \exp(j\omega(t-iT)) \quad (1)$$

where, $a_i$ is a transmitted symbol, $i=0, 1, 2 \ldots n$, and $s_n$ and $s_j$ represent the power of noise and CW interference (jamming) signal, respectively. If the noise power is negligibly low, the tap signal $u_i$ is given by:

$$u_i = a_{-i} + \sqrt{s_j} \exp(j\omega(t-iT)) \quad (2)$$

The outputs of delay-tap elements 10 are connected respectively to tap-gain multipliers $11_1$–$11_n$ for weighting the tap signals with respective tap-gain coefficient values $w_1$ through $w_n$. Each tap-gain coefficient value $w_i$ ($i=1$ through n) can be approximated by Equation (1) if the signal-to-noise ratio of the incoming signal is high:

$$w_i = \frac{-1}{\left(1+\frac{s_n}{u_i+s_n}\right)n + \frac{s_n}{s_j}} \exp(j\omega iT) \approx \frac{-1}{n}\exp(j\omega iT) \quad (3)$$

The input signal of the interference canceller and the outputs of the multipliers $11_1$–$11_n$ are summed together by an adder 12, whose output is coupled to the subtractor 105. The tap gains of multipliers $11_1$–$11_n$ of the feedforward filter 101 are updated by update circuits $103_1$–$103_n$ of identical structure.

Each update circuit 103 comprises a complex conjugate converter 14, a complex multiplier 15, a subtractor 16, a T-time delay element 17 connected to the output of subtractor 16, and a latch 18. Complex conjugate converter 14 converts the signal $u_1$ at the output of corresponding delay tap $10_0$ to a complex-valued signal $u_1^*$ and outputs it to multiplier 15 where it is multiplied by the output $(\mu)(\epsilon)$ of multiplier 6 to produce a tap-gain update (or correction) signal $(\mu)(\epsilon^k)(u_1^{*k})$, (where k represents the time indicator). The updated tap-gain coefficient value $w_1^{k+1}$ is latched in latch 18 and applied to the multiplier $11_1$. Therefore, the tap-gain coefficient $w_i^{k+1}$ of the feedforward filter 1 is given by:

$$w_i^{k+1} = w_i^k - (\mu)(\epsilon^k)(u_i^{*k}) \quad (4)$$

In a similar manner, feedback filter 102 includes a tap delay line formed by a series of unit-time (T) delay tap elements $20_1$–$20_n$ where the output of decision circuit 106 is applied to produce a series of successively delayed tap signals $v_1, v_2, \ldots v_n$. The outputs of delay-tap elements 20 are connected respectively to tap-gain multipliers $21_1$–$21_n$ for weighting the tap signals with respective tap gains $f_1$ to $f_n$.

The outputs of the multipliers $21_1$–$21_n$ are summed together by an adder 22, whose output is coupled to the subtractor 105. The tap gains coefficients of multipliers $21_1$–$21_n$ of the feedback filter 102 are updated by update circuits $104_1$–$104_n$ of identical structure.

Similar to the update circuit 103, each update circuit 104 comprises a complex conjugate converter 24, a complex multiplier 25, a subtractor 26, a T-time delay element 27 connected to the output of subtractor 26, and a latch 28. Complex conjugate converter 24 converts the signal $v_1$ at the output of corresponding delay tap $20_0$ to a complex-valued signal $v_1^*$ and outputs it to multiplier 25 where it is multiplied by the output $(\mu)(\epsilon)$ of multiplier 108 to produce a tap-gain update signal $(\mu)(\epsilon^k)(v_1^{*k})$. The update signal from complex multiplier 25 is applied to subtractor 26 where it is subtracted from the previous tap gain $f_1^k$ which appears at the output of unit-time delay element 27 to produce an updated tap gain signal $f_1^{k+1}$ which is equal to $f_1^k - (\mu)(\epsilon^k)(v_1^{*k})$. The updated tap gain $f_1^{k+1}$ is latched in latch 28 and applied to the multiplier $21_1$. Therefore, the tap gain $f_i^{k+1}$ of the feedforward filter 102 is given by:

$$f_i^{k+1} = f_i^k - (\mu)(\epsilon^k)(v_i^{*k}) \tag{5}$$

Note that all unit-time delay elements 10, 20, delay elements 16, 26 and latches 18, 28 are clocked from the same clock source, not shown.

Since the signal-to-noise ratio of the incoming signal is assumed to be sufficiently high to ignore the noise power, each tap gain $f_i$ is approximated by Equation (6) as follows:

$$f_i = w_i \approx \frac{-1}{n} \exp(j\omega iT) \tag{6}$$

When the reference symbol $a_0$ has been applied to the feedforward filter 101, the output signal $x(t)$ of this filter is given by:

$$\begin{aligned} x(t) &= u_0 + \sum_{i=1}^{n} w_i \cdot u_i \\ &= a_0 + \sqrt{s_j} \exp(j\omega t) + \\ &\quad \sum_{i=1}^{n} \left(-\frac{1}{n}\right) \exp(j\omega iT)\{a_{-i} + \sqrt{s_j} \exp(j\omega(t - iT))\} \\ &= a_0 + \sqrt{s_j} \exp(j\omega t) + \\ &\quad \sum_{i=1}^{n} \left(-\frac{1}{n}\right) \exp(j\omega iT) \cdot a_{-1} - \sum_{i=1}^{n} \frac{1}{n} \sqrt{s_j} \exp(j\omega t) \\ &= a_0 + \sum_{i=1}^{n} \left(-\frac{1}{n}\right) \exp(j\omega iT) \cdot a_{-i} \\ &= a_0 + \sum_{i=1}^{n} w_i \cdot a_{-i} \end{aligned} \tag{7}$$

It is seen that the CW interference component of symbol $a_0$ is cancelled by the feedforward filter 101. However, the second term of Equation (7) indicates that the symbol $a_0$ is distorted ("notched") by intersymbol interference caused by previous symbols $a_{-1}, a_{-2}, \ldots a_{-n}$. When these intersymbol interference components have been delivered from feedforward filter 101, their corresponding outputs at the output of decision circuit 106 are propagating through the tapped-delay line of feedback filter 102, causing it to produce the following output signal $y(t)$ which is an estimate of intersymbol interference of symbol $a_0$:

$$y(t) = \sum_{i=1}^{n} f_i \cdot a_{-i} = \sum_{i=1}^{n} w_i \cdot a_{-i} \tag{8}$$

By coupling the output of feedback filter 102 to subtractor 105 as a feedback signal, the second term of Equation (7) is cancelled with the estimate $y(t)$ of intersymbol interference and the following equalized output signal $z(t)$ is generated at the input of decision circuit 106:

$$z(t) = x(t) - y(t) = a_0 \tag{9}$$

Therefore, the distortion of symbol $a_0$ due to intersymbol interference can be equalized by the feedback filter 102.

According to the present invention, a complex correlator 109 is provided to determine the correlation between signals $u_0$ and $u_n$. Complex correlator 109 provides conversion on signal $u_n$ at the output of delay tap $10_n$ to a complex-valued signal $u_0^*$, multiplies it with signal $u_0$ to generate products $(u_0)(u_n^*)$ and takes an expected (average) value of the products to yield a correlation signal $\eta$ as follows:

$$\eta = E[u_0 \cdot u_n^*] = s_j \exp(j\omega nt) \tag{10}$$

The correlation signal $\eta$ is applied to a comparator 110 in which it is compared with a reference value $\gamma$ to supply its output to latches 18 and latches 28. The correlation signal $\eta$ is obtained within a period of time which is much smaller than the period of CW interference bursts.

In the presence of CW interference of substantial magnitude, the correlation value $\eta$ is higher than $\gamma$, and comparator 110 generates a logic-0 output (an update enable signal), so that the tap gains $w_i$ and $f_i$ are adaptively updated according to the LMS algorithm, namely, they are respectively adjusted in accordance with Equations (4) and (5). When the magnitude of the CW interference reduces to a level lower than a specified value, the correlation value $\eta$ becomes lower than $\gamma$, and comparator 110 produces a logic-1 output (an update inhibit signal) to inhibit the LMS-algorithm updating of all tap gains.

As long as the CW interference is lower than the specified level, the tap gain of each update circuit of the decision feedback equalizer is held at the value which the latch of the update circuit attained at the instant the update inhibit signal is generated, and both feedforward and feedback filters operate with tap-gain values given by the following Equations (11) and (12):

$$w_i^{k+1} = w_i^k \tag{11}$$

$$f_i^{k+1} = f_i^k \tag{12}$$

Therefore, Equation (7) still holds in the absence of CW interference, and the intersymbol interference can still be removed by the feedback filter 102 even though the LMS control is inhibited.

Figure 2:
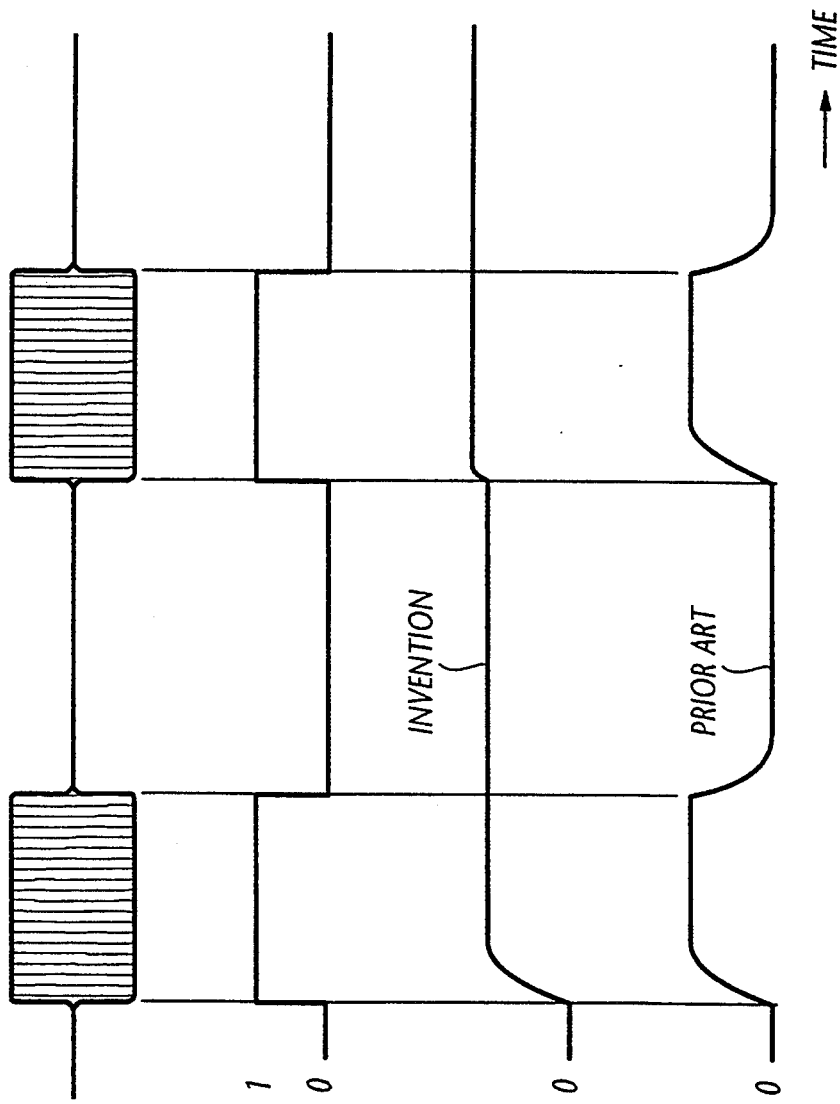
FIGS. 2A–2D are timing diagrams illustrating the operation of the first embodiment.

The operation of the present invention will be fully understood with reference to FIGS. 2A to 2D. If the desired signal is affected by a series of CW jamming pulses as shown in FIG. 2A, comparator 110 produces a logic-1 output in the presence of each CW pulse as shown in FIG. 2B to update the tap weights of the decision-feedback equalizer with the LMS algorithm to control each tap weight to an optimum value. In the absence of the CW pulse interference, comparator 110 produces a logic-0 output to maintain the optimum value. As illustrated in FIG. 2C, each tap weight coefficient can be quickly controlled to an optimum value at the leading edge transition of each CW pulse except for an initial period in which the tap weight exponentially increases from zero immediately following the arrival of the first CW interference pulse. In the case of the prior art decision-feedback equalizer, a substantial amount of time is taken to reach the optimum tap weight value at the transition of each CW pulse as shown in FIG. 2D. Since the correlation signal $\eta$ is obtained within a period much smaller than the period of CW interference bursts, the adaptive tap-gain control loops of the decision-feedback equalizer is not disturbed by the pulsed CW interference.

Figure 3:
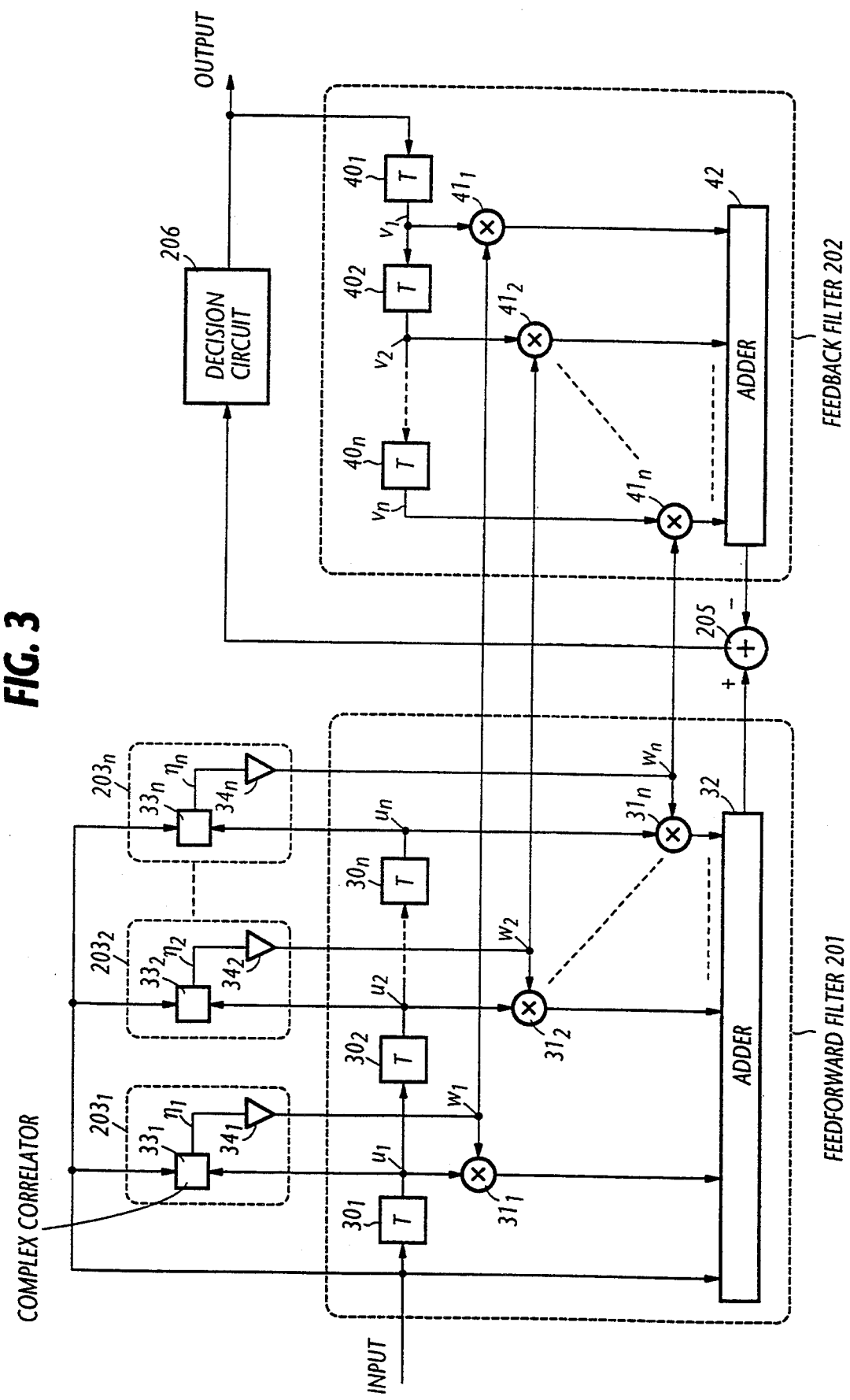
FIG. 3 is a block diagram of an interference canceller according to a second embodiment of the present invention.

FIG. 3 is a block diagram of a second embodiment of the present invention which differs from the first embodiment in that the interference is a usual continuous wave that is not modulated with pulses. This embodiment comprises a feedforward filter 201, a feedback filter 202, a subtractor 205 and a decision circuit 206. Feedforward filter 201 comprises a tapped-delay line formed by a series of unit-time (T) delay elements $30_1$–$30_n$. To the output of each of delay tap elements $30_1$–$30_n$ are connected a corresponding one of tap-gain multipliers $31_1$–$31_n$. Tap-gain update circuits $203_1$–$203_n$ are connected respectively to the output of delay taps $30_1$–$30_n$. Each update circuit $203_i$ comprises a complex correlator $33_1$ and an automatic gain controlled amplifier or normalizer $34_i$. Complex correlators $33_1$–$33_n$ provide the detection of correlations between the reference signal $u_0$ at the input of delay tap $30_1$ and the complex-valued versions $u_1^*, u_2^*, \ldots u_n^*$ of signals $u_1, u_2, \ldots u_n$ at the outputs of delay taps $30_1$–$30_n$ and average the correlations to produce the following correlator outputs $\eta_i$ (where i=1, 2 ... n) from complex correlator $33_i$:

$$\eta_i = E[u_0 \cdot u_i^*] = s_j \exp(j\omega_i t) \qquad (13)$$

The correlator outputs $\eta_1$ to $\eta_n$ are supplied to normalizer $34_1$–$34_n$, respectively. Each normalizer $34_i$ normalizes the amplitude of jamming signal $s_j$ from the corresponding correlator $33_i$ by a factor $-1/n$ to produce an output signal so that it is equal to the tap gain $w_i$ given by Equation (3). By coupling the output of each normalizer $33_i$ to the corresponding tap-gain multiplier $31_i$, the tap gain of each multiplier $31_i$ is updated to an optimum value as in the previous embodiment. The reference signal $u_0$ and the output of multipliers $31_1$–$31_n$ are summed together by an adder 32 to generate an output signal x(t) given by Equation (7). The signal x(t) is applied to subtractor 205, where it is combined with the output of feedback filter 202, the output of subtractor 205 being fed into decision circuit 206.

Feedback filter 202 comprises a tapped-delay line formed by a series of unit-time (T) delay elements $40_1$–$40_n$ to which the output of decision circuit 206 is connected to produce a series of signals $v_1, v_2, \ldots v_n$. To the output of each delay tap element $40_i$ is connected a corresponding tap-gain multiplier $41_i$. Since the tap gains of the feedback filter is approximately equal to those of the feedforward filter as given by Equation (6), the output of the corresponding normalizer $34_i$ is also connected to the corresponding tap-gain multiplier $41_i$ of feedback filter 202. The outputs of multipliers $41_1$–$41_n$ are summed by an adder 42 to produce the output signal y(t) represented by Equation (8).

It is seen that in the second embodiment of this invention the decision output of the equalizer does not contribute to the derivation of its tap-gain update values. This arrangement keeps the equalizer from uncontrollable divergence of tap-gain values caused by the propagation of decision errors.

Figure 4:
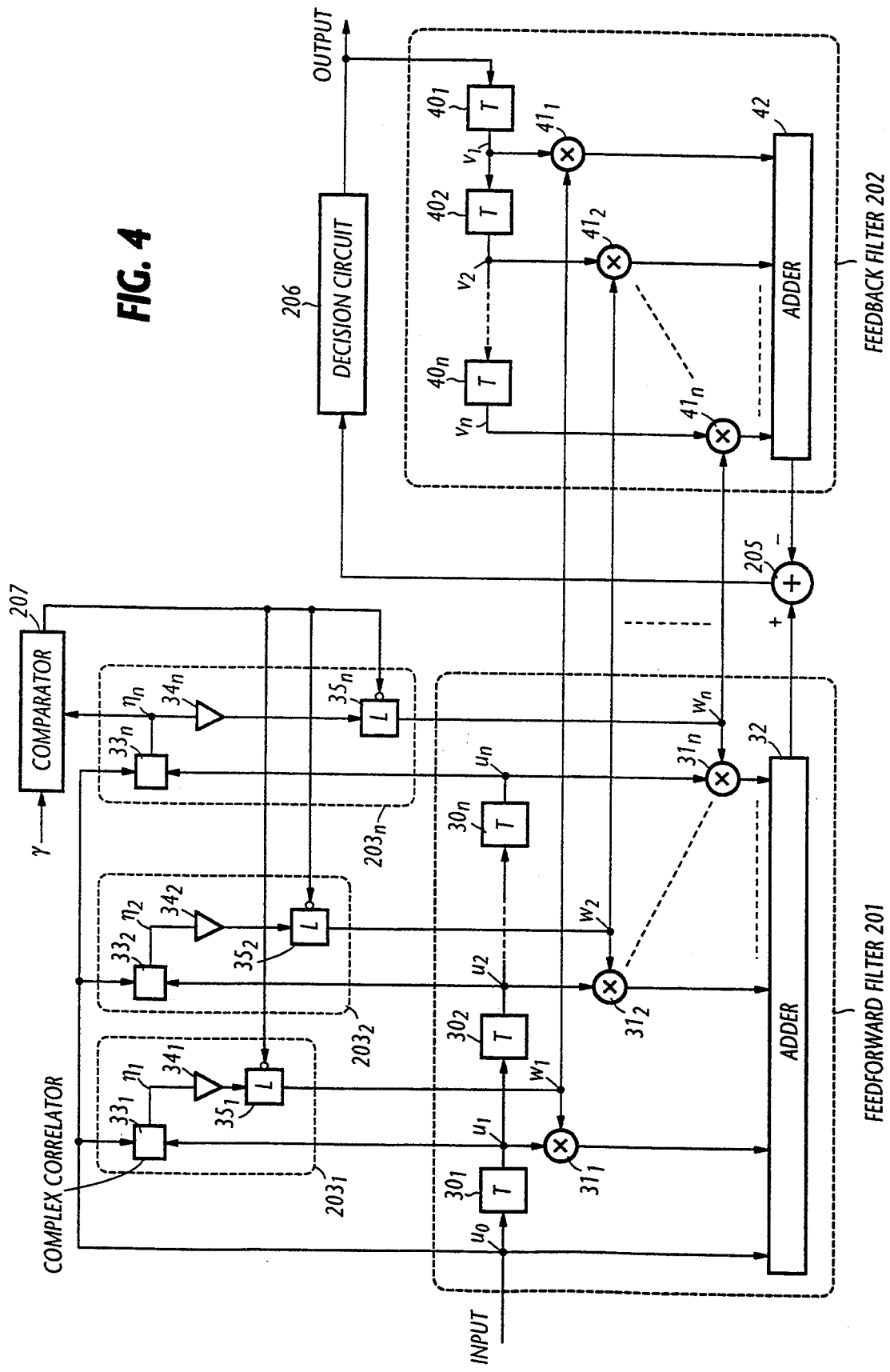
FIG. 4 is a block diagram of a modification of the second embodiment incorporating the feature of the first embodiment.

If the interference source is a pulsed radar as in the case of the first embodiment, the embodiment of FIG. 3 is modified to reduce the slow-response effect of tap-gain values by incorporating a comparator 207 and latches $35_1$–$35_n$ as shown in FIG. 4. Each latch $35_i$ is connected between the output of corresponding normalizer $34_i$ and the corresponding tap-gain multiplier $31_i$. The tap-gain multipliers 41 of feedback filter 202 receive their tap-gain values from the output of corresponding latches 35. Each latch $35_i$ is clocked to store and forward the output of the corresponding normalizer $33_i$ to the corresponding multiplier $31_i$ when the latch is enabled as the incoming signal is being affected by a pulsed CW interference. Comparator 207 is connected to the output of complex correlator $33_n$ for making a comparison between the correlator output $\eta_n$ and the reference value $\gamma$ to cause all latches 35 to hold their stored values when the correlator output is lower than the reference. The adaptively controlled tap-gain values are prevented from reducing to zero in the absence of pulsed CW interference and quickly used for adaptive control when a pulsed CW interference arrives again.

Figure 5:
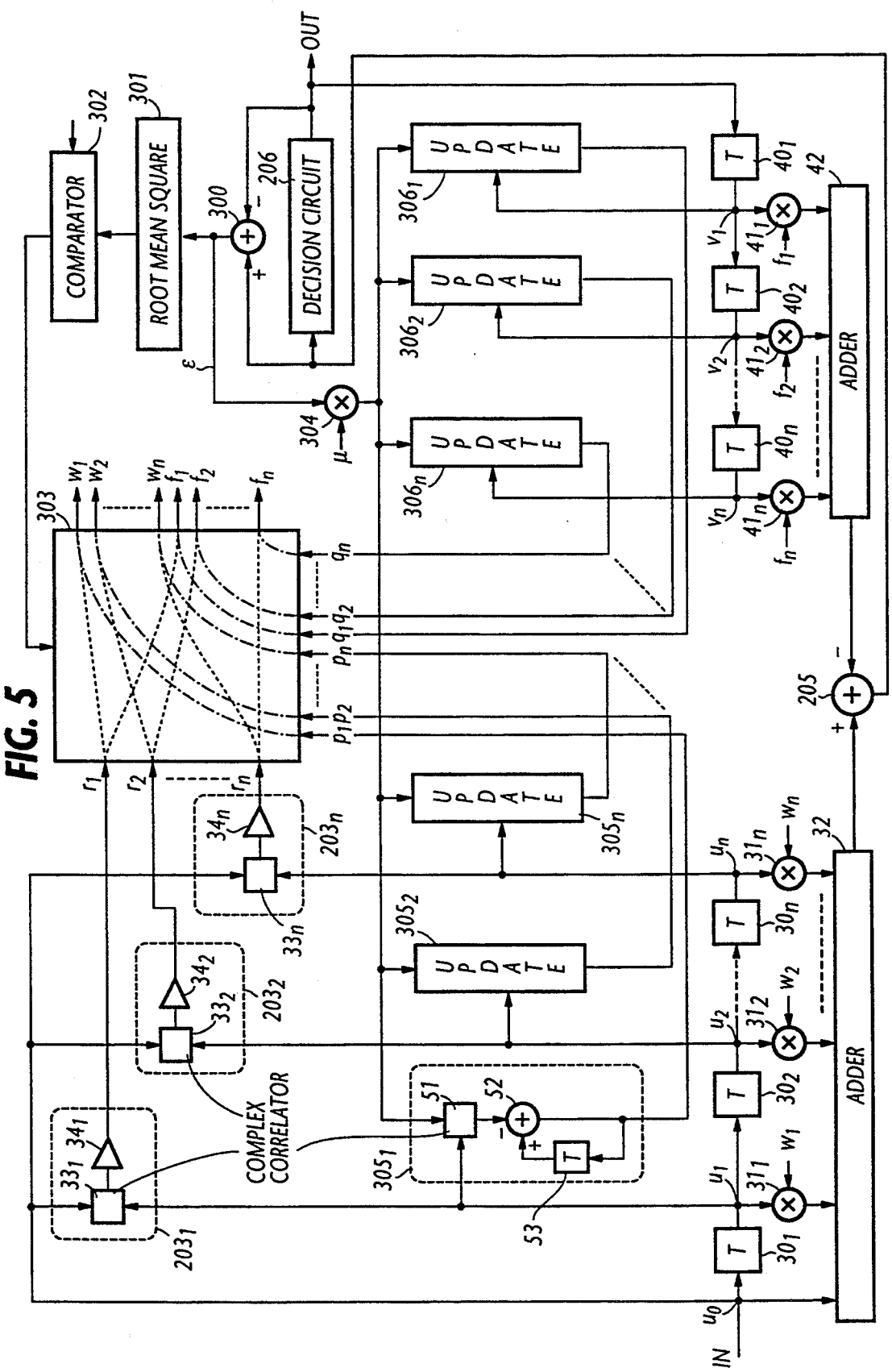
FIG. 5 is a block diagram of a further modification of the second embodiment.

While the tap-gain values of FIG. 3 given by Equation (13) are valid when the signal-to-noise ratio is relatively high, they deviate from optimum values if the SNR is low. To this end, the embodiment of FIG. 3 is modified as shown in FIG. 5. This modification differs from the FIG. 3 embodiment by the inclusion of an error detector 300, a root-means-square detector 301, a comparator 302, a switch 303, a multiplier 304 and a plurality of decision-controlled tap-gain update circuits $305_1$–$305_n$ and $306_1$–$306_n$. Error detector 300 is connected to the input and output of decision circuit 206 to produce an error signal a in a manner similar to FIG. 1. The error output $\epsilon$ is applied to the root-mean-square detector 301 where the root-mean-square (effective) value of the error is detected and applied to comparator 302 for comparison with a threshold representing a prescribed noise level to operate the switch 303.

The error signal is also applied to multiplier 304 where it is multiplied with a correction constant $\mu$ to produce an output $(\epsilon)(\mu)$ which is applied to the decision-controlled tap-gain update circuits 305 and 306. Update circuits $305_1$–$305_n$ are connected respectively to the output of delay taps $30_1$–$30_n$ and update circuits $306_1$–$306_n$ are connected respectively to the output of delay taps $40_1$–$40_n$. The update circuit $305_i$ comprises a complex correlator 51, a subtractor 52 and a delay element 53. Complex correlator 51 detects the correlation between a complex-valued version of the tap signal $u_i$ from the corresponding delay tap $30_i$ and the output of multiplier 304 to feed the subtractor 52 with a correction signal $(\mu)(\epsilon)(u_i^*)$ to subtract it from the previous signal from delay element 53 to produce a tap-gain control signal $w_i^{k+1} = w_i^k - (\mu)(\epsilon^k)(u_i^{*k})$. In a similar manner, each update circuit $306_i$ produces $f_i^{k+1} = f_i^k - (\mu)(\epsilon^k)(v_i^{*k})$.

The outputs of normalizers $34_1$–$34_n$ are supplied to input terminals $r_1$–$r_n$ of switch 303 and the outputs of update circuits $305_i$ and $306_i$ are supplied to input terminals $P_i$ and $q_i$ of switch 303. Switch 303 has output terminals $w_1$–$w_n$ connected to tap-gain multipliers $31_1$–$31_n$, respectively, and output terminals $f_1$–$f_n$ connected to tap-gain multipliers $41_1$–$41_n$, respectively. When the signal-to-noise ratio of the incoming signal is relatively high, comparator 302 produces no signal and broken-line paths are established in switch 303 so that each input terminals $r_i$ is connected to both $w_i$ and $f_i$. When the r.m.s value of the decision error detected by detector 300 becomes lower than the threshold of comparator 302, the latter controls the switch 303 so that it clears the broken-line paths and establishes chain-dot-line paths between input terminals $P_1$–$P_n$ and output terminals $w_1$–$w_n$, respectively, and input terminals $q_1$–$q_n$ and output terminals $f_1$–$f_n$, respectively. Therefore, when the D/U ratio of the incoming signal is relatively high during initial pull-in operation, the r.m.s value of the error output of error detector 300 is higher than the threshold of comparator 302. Under this high D/U condition, the outputs of normalizers $34_1$–$34_n$ are supplied respectively to the tap-gain multipliers $31_1$–$31_n$ and $41_1$–$41_n$ according to Equation (3) in a manner similar to the embodiment of FIG. 3. During a low D/U condition, the r.m.s value of the error output of error detector 300 is lower than the threshold of comparator 302 and switch 302 is operated to change its paths so that the outputs of update circuits $305_1$–$305_n$ are supplied to the tap-gain multipliers s $31_1$–$31_n$ and the outputs of update circuits $306_1$–$306_n$ to the tap-gain multipliers s $41_1$–$41_n$. In this way, the tap gains of the decision-feedback equalizer are controlled in accordance Equations (4) and (5).

Figure 6:
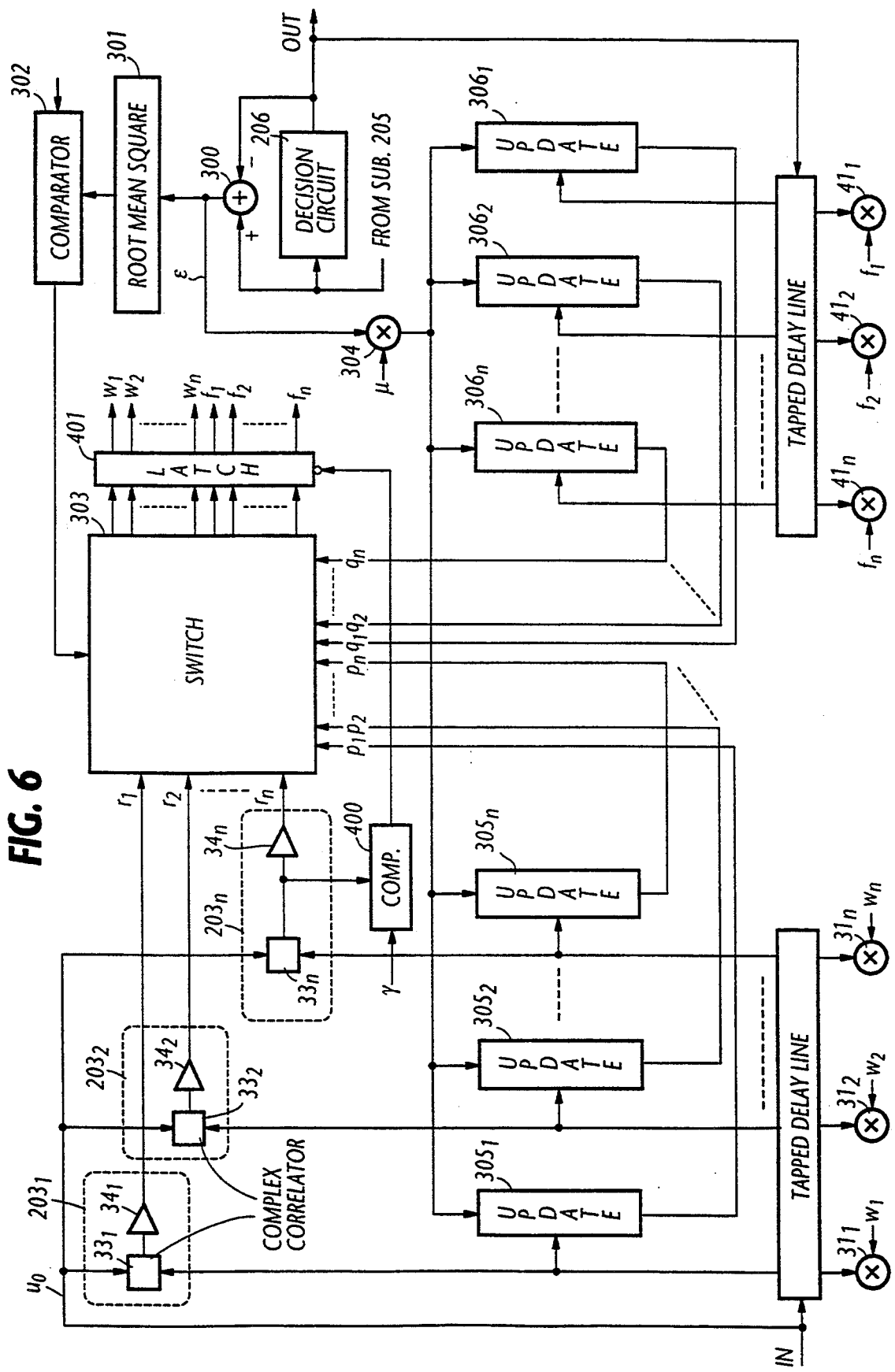
FIG. 6 is a block diagram of a modification of the FIG. 5 embodiment incorporating the feature of the first embodiment.

The tap-gain quick-response control feature of the present invention can also be incorporated in the embodiment of FIG. 5 as illustrated in an embodiment of FIG. 6 by the provision of a comparator 400 and a latch circuit 401. Latch circuit 401 is connected to the output terminals of switch 303 and is normally clocked to store and forward switched input signals to the tap-gain multipliers 31 and 41. The output of correlator $33_n$ is compared with the reference value $\gamma$ by comparator 400 which causes the latch circuit 401 to hold the stored tap gains when the correlator output falls below the reference value $\gamma$.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. An interference canceller comprising:
a feedforward equalizer comprising a first tapped delay line for receiving an input signal and defining first delay-line taps for producing successively delayed versions of the received signal at said first delay-line taps, first tap-gain multipliers for operating on the delayed signals at said first delay-line taps, and first summing means for combining said input signal received by the first tapped delay line and output signals from said first tap-gain multipliers to produce an equalized feedforward output signal;
a decision circuit for deriving a decision output signal from an equalized desired signal;
a decision error detector for detecting a decision error between the input and output of said decision circuit;
a plurality of first tap-gain control circuits for deriving first tap-gain signals from the detected decision error and the delayed signals at said first delay-line taps and respectively applying the first tap-gain signals to said first tap-gain multipliers;
a feedback equalizer for operating on the decision output signal from said decision circuit, the feedback equalizer comprising a second tapped delay line for defining second delay-line taps for producing successively delayed versions of said decision output signal at said second delay-line taps, second tap-gain multipliers for operating on the delayed signals at said second delay-line taps, and second summing means for combining output signals from said second tap-gain multipliers to produce an equalized feedback output signal;
a plurality of second tap-gain control circuits for deriving second tap-gain signals from the detected decision error and the delayed signals at said second delay-line taps and respectively applying the second tap-gain signals to said second tap-gain multipliers,
a complex correlator for detecting a correlation between signals at opposite ends of said first tapped delay line;
means for comparing the detected correlation with a reference value and causing said first tap-gain control circuits and said second tap-gain control circuits to hold said tap-gain signals at most recently attained amplitude values when the detected correlation is lower than the reference value; and
a combiner for combining said equalized feedforward output signal and said equalized feedback output signal and producing and supplying a combined signal to said decision circuit as said equalized desired signal.

2. An interference canceller comprising:
a feedforward equalizer comprising a first tapped delay line for receiving an input signal and defining first N delay-line taps for producing successively delayed versions of the received input signal at said first delay-line taps, first N tap-gain multipliers for operating on the delayed signals at said first delay-line taps, and first summing means for combining said input signal received by the first tapped delay line and output signals from said first tap-gain multipliers to produce an equalized feedforward output signal;
a decision circuit for deriving a decision output signal from an equalized desired signal;
a feedback equalizer for operating on the decision output signal from said decision circuit, the feedback equalizer comprising a second tapped delay line defining second N delay-line taps for producing successively delayed versions of said decision output signal at said second delay-line taps, second tap-gain multipliers for operating on the delayed signals at said second delay-line taps, and second summing means for combining output signals from said second tap-gain multipliers to produce an equalized feedback output signal;
a plurality of tap-gain control circuits for detecting correlations between the input signal received by said first tapped delay line and the delayed signals at said first delay-line taps and normalizing each of the detected correlations by a factor which is reciprocal of the integer N to produce N tap-gain signals and applying the N tap-gain signals respectively to said first N tap-gain multipliers and said N second tap-gain multipliers; and
a combiner for combining said equalized feedforward output signal and said equalized feedback output signal and producing and supplying a combined signal to said decision circuit as said equalized desired signal.

3. An interference canceller comprising:
a feedforward equalizer comprising a first tapped delay line for receiving an input signal and defining first N delay-line taps for producing successively delayed versions of the received input signal at said first delay-line taps, first N tap-gain multipliers for operating on the delayed signals at said first delay-line taps, and first summing means for combining said input signal received by the first tapped delay line and output signals from said first tap-gain multipliers to produce an equalized feedforward output signal;

a decision circuit for deriving a decision output signal from an equalized desired signal;

a feedback equalizer for operating on the decision output signal from said decision circuit, the feedback equalizer comprising a second tapped delay line defining second N delay-line taps for producing successively delayed versions of said decision output signal at said second delay-line taps, second tap-gain multipliers for operating on the delayed signals at said second delay-line taps, and second summing means for combining output signals from said second tap-gain multipliers to produce an equalized feedback output signal;

a plurality of first tap-gain control circuits for detecting correlations between the input signal received by said first tapped delay line and the delayed signals at said first delay-line taps and normalizing each of the detected correlations by a factor which is reciprocal of the integer N and producing first N tap-gain signals;

a decision error detector for detecting a decision error between the input and output of said decision circuit;

a plurality of second tap-gain control circuits for deriving second N tap-gain signals from the detected decision error and the delayed signals at said first delay-line taps;

a plurality of third tap-gain control circuits for deriving third N tap-gain signals from the detected decision error and the delayed signals at said second delay-line taps;

means for detecting a root-mean-square value of the detected decision error, determining whether the root-mean-square value is higher or lower than a prescribed value;

switch means for establishing first paths for respectively coupling said first N tap-gain signals to said first N tap-gain multipliers and said second N tap-gain multipliers when the root-mean-square value is determined to be higher than the prescribed value and clearing said first paths and establishing second paths for respectively coupling said second N tap-gain signals to said first N tap-gain multipliers and respectively coupling said third N tap-gain signals to said second N tap-gain multipliers when the root-mean-square value is determined to be lower than the prescribed value; and a combiner for combining said equalized feedforward output signal and said equalized feedback output signal and producing and supplying a combined signal to said decision circuit as said equalized desired signal.

4. An interference canceller comprising:

a feedforward equalizer comprising a first tapped delay line for receiving an input signal and defining first N delay-line taps for producing successively delayed versions of the received input signal at said first delay-line taps, first N tap-gain multipliers for operating on the delayed signals at said first delay-line taps, and first summing means for combining said input signal received by the first tapped delay line and output signals from said first tap-gain multipliers to produce an equalized feedforward output signal;

a decision circuit for deriving a decision output signal from an equalized desired signal;

a feedback equalizer for operating on the decision output signal from said decision circuit, the feedback equalizer comprising a second tapped delay line defining second N delay-line taps for producing successively delayed versions of said decision output signal at said second delay-line taps, second tap-gain multipliers for operating on the delayed signals at said second delay-line taps, and second summing means for combining output signals from said second tap-gain multipliers to produce an equalized feedback output signal;

a plurality of tap-gain control circuits for detecting correlations between said input signal received by said first tapped delay line and said delayed signals at said first delay-line taps and normalizing each of the detected correlations by a factor which is reciprocal of the integer N to produce N tap-gain signals and applying the N tap-gain signals respectively to said first N tap-gain multipliers and said N second tap-gain multipliers;

means for comparing the correlation, which is detected by one of the tap-gain control circuits between signals at opposite ends of the first tapped-delay line, with a reference value and causing said tap-gain control circuits to hold said N tap-gain signals at most recently attained amplitude values when the detected correlation is lower than the reference value; and a combiner for combining said equalized feedforward output signal and said equalized feedback output signal and producing and supplying a combined signal to said decision circuit as said equalized desired signal.

5. An interference canceller comprising:

a feedforward equalizer comprising a first tapped delay line for receiving an input signal and defining first N delay-line taps for producing successively delayed versions of the received input signal at said first delay-line taps, first N tap-gain multipliers for operating on the delayed signals at said first delay-line taps, and first summing means for combining said input signal received by the first tapped delay line and output signals from said first tap-gain multipliers to produce an equalized feedforward output signal;

a decision circuit for deriving a decision output signal from an equalized desired signal;

a feedback equalizer for operating on the decision output signal from said decision circuit, the feedback equalizer comprising a second tapped delay line defining second N delay-line taps for producing successively delayed versions of said decision output signal at said second delay-line taps, second tap-gain multipliers for operating on the delayed signals at said second delay-line taps, and second summing means for combining output signals from said second tap-gain multipliers to produce an equalized feedback output signal;

a plurality of first tap-gain control circuits for detecting correlations between the input signal received by said first tapped delay line and the delayed signals at said first delay-line taps and normalizing each of the detected correlations by a factor which is reciprocal of the integer N and producing first N tap-gain signals;

a decision error detector for detecting a decision error between the input and output of said decision circuit;

a plurality of second tap-gain control circuits for deriving second N tap-gain signals from the detected decision error and the delayed signals at said first delay-line taps;

a plurality of third tap-gain control circuits for deriving third N tap-gain signals from the detected decision error and the delayed signals at said second delay-line taps;

means for detecting a root-mean-square value of the detected decision error, determining whether the root-mean-square value is higher or lower than a prescribed value;

switch means for establishing first paths for respectively coupling said first N tap-gain signals to said first N tap-gain multipliers and said N second tap-gain multipliers when the root-mean-square value is determined to be higher than the prescribed value and clearing said first paths and establishing second paths for respectively coupling said second N tap-gain signals to said first N tap-gain multipliers and respectively coupling said third N tap-gain signals to said second N tap-gain multipliers when the root-mean-square value is determined to be lower than the prescribed value;

means for determining whether the correlation, which is detected by one of the first tap-gain control circuits between signals at opposite ends of the first tapped-delay line, is higher or lower than a reference value;

means for holding ones of said first, second and third N tap-gain signals which are coupled by said switch means to said first and second N tap-gain multipliers at most recently attained amplitude values when the correlation is determined to be lower than the reference value; and a combiner for combining said equalized feedforward output signal and said equalized feedback output signal and producing and supplying a combined signal to said decision circuit as said equalized desired signal.

* * * * *